United States Patent
Isozaki et al.

(10) Patent No.: US 10,698,838 B2
(45) Date of Patent: Jun. 30, 2020

(54) DATA STORAGE APPARATUS

(71) Applicant: Toshiba Memory Corporation, Minato-ku, Tokyo (JP)

(72) Inventors: Hiroshi Isozaki, Kawasaki Kanagawa (JP); Teruji Yamakawa, Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 297 days.

(21) Appl. No.: 15/913,963

(22) Filed: Mar. 7, 2018

(65) Prior Publication Data

US 2019/0087353 A1    Mar. 21, 2019

(30) Foreign Application Priority Data

Sep. 20, 2017 (JP) ................. 2017-180715

(51) Int. Cl.
*G06F 12/14* (2006.01)
*G06F 21/78* (2013.01)
(Continued)

(52) U.S. Cl.
CPC ........ *G06F 12/1408* (2013.01); *G06F 21/575* (2013.01); *G06F 21/602* (2013.01);
(Continued)

(58) Field of Classification Search
CPC .. G06F 12/1408; G06F 21/575; G06F 21/602; G06F 21/6218; G06F 21/78;
(Continued)

(56) References Cited

U.S. PATENT DOCUMENTS

| | | | | |
|---|---|---|---|---|
| 8,230,238 B2 * | 7/2012 | Allalouf | .......... | G06F 1/32 713/300 |
| 8,468,591 B2 * | 6/2013 | Silverstone | ......... | G06F 9/45558 |

(Continued)

FOREIGN PATENT DOCUMENTS

| | | |
|---|---|---|
| JP | 2010-503090 A | 1/2010 |
| JP | 2014-513484 A | 5/2014 |
| JP | 2016-535476 A | 11/2016 |

OTHER PUBLICATIONS

Haiyan Wu, Research on the Data Storage and Access Model in Distributed Computing Environment, Nov. 2008, 2008 Third International Conference on Convergence and Hybrid Information Technology, pp. 1-4.*

(Continued)

*Primary Examiner* — Farid Homayounmehr
*Assistant Examiner* — Raied A Salman
(74) *Attorney, Agent, or Firm* — White & Case LLP

(57) ABSTRACT

According to one embodiment, a data storage apparatus includes a processor. The processor protects data on a memory by encryption in a first mode or a second mode. The processor stores a first image, a second image and a third image. The first image reproduces a first state which is an initial state where the data storage apparatus is set to neither the first mode nor the second mode. The second image reproduces a second state which is an initial state in the first mode. The third image reproduces a third state which is an initial state in the second mode. The processor is capable of performing a first process to transition from the first state to the second state, and performing a second process to transition from the first state to the third state.

14 Claims, 16 Drawing Sheets

(51) Int. Cl.
*G06F 21/62* (2013.01)
*H04L 9/32* (2006.01)
*G06F 21/57* (2013.01)
*H04L 9/08* (2006.01)
*G06F 21/60* (2013.01)
*G06F 21/79* (2013.01)
*G06F 21/80* (2013.01)

(52) U.S. Cl.
CPC .......... *G06F 21/6218* (2013.01); *G06F 21/78* (2013.01); *G06F 21/79* (2013.01); *G06F 21/80* (2013.01); *H04L 9/0891* (2013.01); *H04L 9/0897* (2013.01); *H04L 9/3226* (2013.01)

(58) Field of Classification Search
CPC ....... G06F 21/79; G06F 21/80; H04L 9/0891; H04L 9/0897; H04L 9/3226
See application file for complete search history.

(56) References Cited

U.S. PATENT DOCUMENTS

| | | | | |
|---|---|---|---|---|
| 9,069,703 B2* | 6/2015 | Raam | .................... | G06F 21/606 |
| 9,532,102 B2* | 12/2016 | Choi | ................ | H04N 21/42222 |
| 9,536,083 B2* | 1/2017 | Chapman, III | ......... | G06F 21/53 |
| 9,772,875 B2* | 9/2017 | Draluk | .................... | G06F 21/62 |
| 2003/0225962 A1* | 12/2003 | Hirosawa | ................ | G06F 21/79 |
| | | | | 711/103 |
| 2008/0065903 A1* | 3/2008 | Goodman | ........... | G06F 21/6218 |
| | | | | 713/193 |
| 2010/0034375 A1* | 2/2010 | Davis | .................... | G06F 21/606 |
| | | | | 380/42 |
| 2014/0250491 A1* | 9/2014 | Fleischman | ............. | G06F 21/64 |
| | | | | 726/1 |
| 2015/0101012 A1* | 4/2015 | White | ................... | H04L 63/062 |
| | | | | 726/1 |
| 2016/0196424 A1* | 7/2016 | Chapman, III | ......... | G06F 21/53 |
| | | | | 726/1 |

OTHER PUBLICATIONS

TCG, TCG Storage Security Subsystem Class: Opal Specification, https://trustedcomputinggroup.org/resource/storage-work-group-storage-security-subsystem-class-opal/, Jan. 2009, pp. 1-4.*

Trusted Computing Group, "TCG Storage Security Subsystem Class: Enterprise," Specification Version 1.01, Revision 1.00; Aug. 5, 2015, pp. 1-83.

Trusted Computig Group, "TCG Storage Security Subsystem Class: Opal," Specification Version 2.01, Revision 1.00, Aug. 5, 2015, pp. 1-72.

* cited by examiner

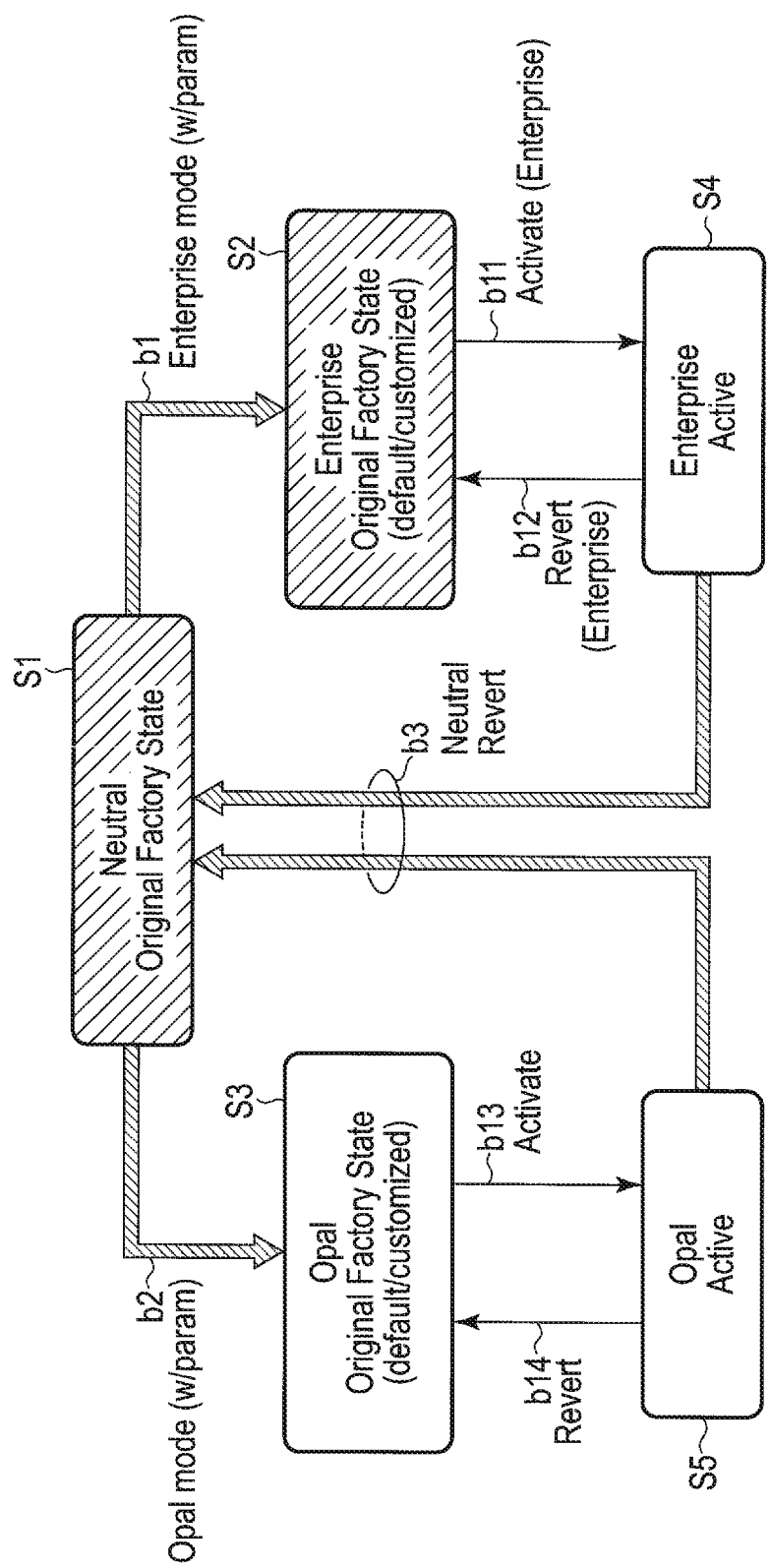
F I G. 3

| Mode | PIN type |
|---|---|
| Enterprise | Administrator PIN (Admin PIN) |
| | Dedicated PIN |
| | User PIN (User PIN) |
| Opal | Owner PIN (SID PIN) |
| | Administrator PIN (Admin PIN) |
| | Dedicated PIN |
| | User PIN (User PIN) |

| Command | Authority | |
|---|---|---|
| "Enterprise mode" | Dedicated PIN | b1 |
| "Opal mode" | Dedicated PIN | b2 |

(New: both rows)

(B)

| Command | Authority | |
|---|---|---|
| "Activate (Enterprise)" | Administrator PIN | b11 |
| "Revert (Enterprise)" | Administrator PIN | b12 |
| "Neutral revert" | Dedicated PIN | b3 |

(New: all rows)

(C)

| Command | Authority | |
|---|---|---|
| "Activate" | Owner PIN | b13 |
| "Revert" | Owner PIN | b14 |
| "Neutral revert" | Dedicated PIN | b3 |

(New: "Neutral revert" row)

| Command | Authority | |
|---|---|---|
| "Enterprise mode" | Dedicated PIN | ← b1 |
| "Opal mode" | Dedicated PIN | ← b2 |

New { b1, b2 }

(B)

| Command | Authority | |
|---|---|---|
| "Authenticate (Enterprise)" | Administrator PIN | ← b11 |
| "Revert (Enterprise)" | Administrator PIN | ← b12 |
| "RevertSP (Enterprise)" | Administrator PIN | ← b12-2 |
| "Neutral revert" | Dedicated PIN | ← b3 |

New { b11, b12, b12-2 }

(C)

| Command | Authority | |
|---|---|---|
| "Activate" | Owner PIN | ← b13 |
| "Revert" | Owner PIN | ← b14 |
| "RevertSP" | Owner PIN | ← b14-2 |
| "Neutral revert" | Dedicated PIN | ← b3 |

New { b14-2 }

FIG. 11

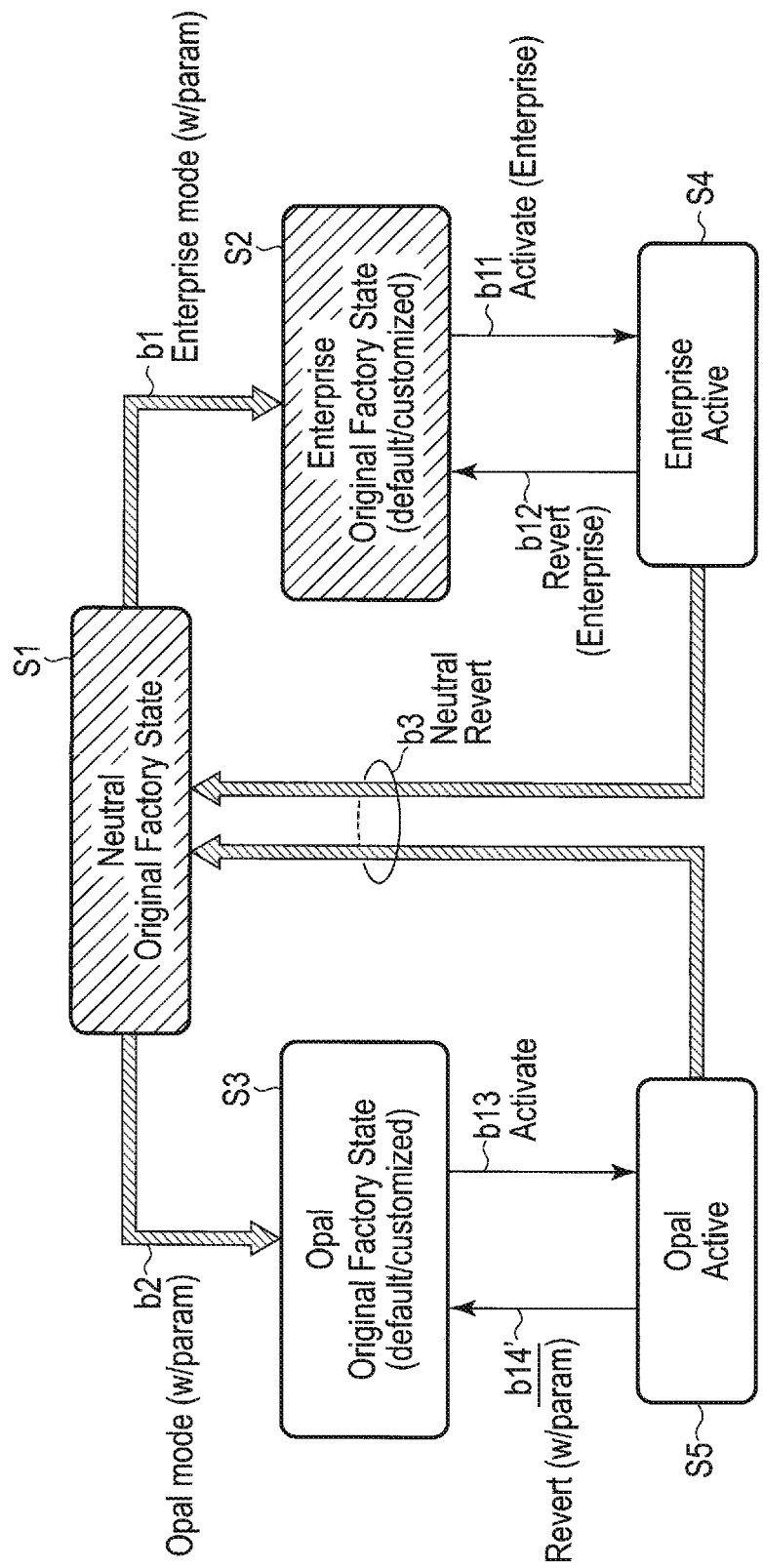
F I G. 14

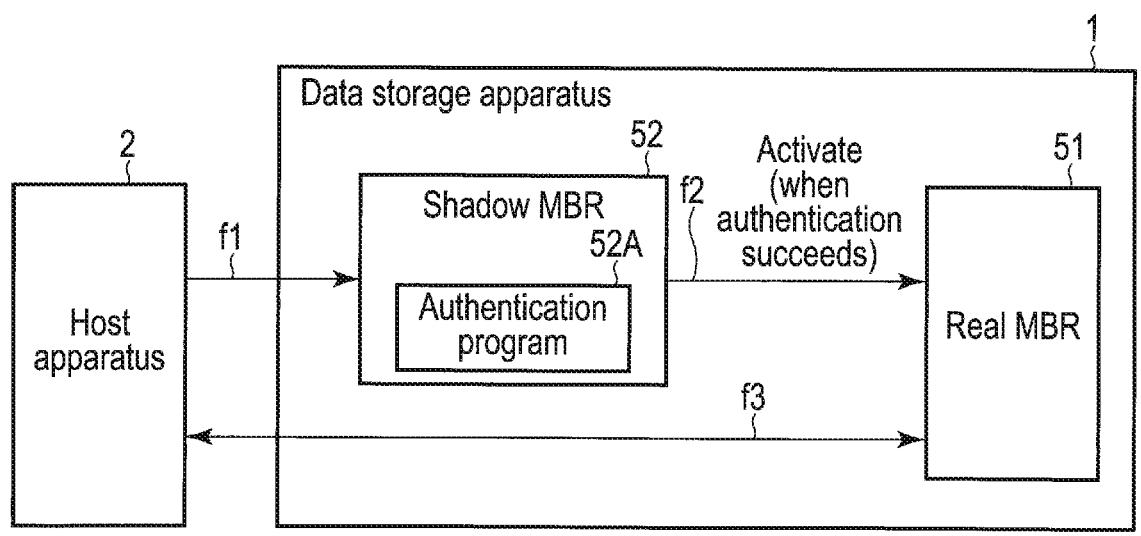
F I G. 15

(A)

| Command | Authority | |
|---|---|---|
| "Enterprise mode" | Dedicated PIN | b1 |
| "Opal mode" | Dedicated PIN | b2 |

New: b1, b2

(B)

| Command | Authority | |
|---|---|---|
| "Activate (Enterprise)" | Administrator PIN | b11 |
| "Revert (Enterprise)" | Administrator PIN | b12 |
| "Opal Revert" | Dedicated PIN | b5 |
| "Neutral revert" | Dedicated PIN | b3 |

New: b11, b12, b5, b3

(C)

| Command | Authority | |
|---|---|---|
| "Activate" | Owner PIN | b13 |
| "Revert" | Owner PIN | b14 |
| "Enterprise Revert" | Dedicated PIN | b4 |
| "Neutral revert" | Dedicated PIN | b3 |

New: b4, b3

FIG. 18

DATA STORAGE APPARATUS

CROSS-REFERENCE TO RELATED APPLICATIONS

This application is based upon and claims the benefit of priority from Japanese Patent Application No. 2017-180715, filed Sep. 20, 2017, the entire contents of which are incorporated herein by reference.

FIELD

Embodiments described herein relate generally to a data storage apparatus.

BACKGROUND

Recently, data leak prevention has been drawing attention. As a countermeasure of data leak, data encryption has become widely used. Data storage apparatuses comprising an encryption function for storing encrypted data have also become widespread.

When data storage apparatuses such as a solid state drive (SSD) and a hard disk drive (HDD) are used, for example, two main cases are considered. Data storage apparatuses may be used for servers mainly targeted to companies or for personal computers (PCs). At the moment, the modules (firmware) implementing the encryption function installed on data storage apparatuses for servers differ from those for PCs. In other words, data storage apparatuses comprising an encryption function are manufactured and distributed as different products between servers and PCs.

Thus, data storage apparatuses comprising an encryption function for servers are different products from those for PCs. This means that suppliers need to manufacture two types of products, and customers need to purchase each type and control the stock of each type.

BRIEF DESCRIPTION OF THE DRAWINGS

FIG. 3 is a diagram shown for explaining the outline of a mechanism provided to allow the data storage apparatus to be used for either a server or a PC according to the first embodiment.

FIG. 4 is a diagram showing the types of PINs managed by the data storage apparatus according to the first embodiment.

FIG. 5 is a diagram showing examples of commands related to the transition of the state of the data storage apparatus and the authority to issue the commands according to the first embodiment.

FIG. 11 is a diagram showing examples of commands related to the transition of the state of the data storage apparatus and the authority to issue the commands according to the second embodiment.

FIG. 14 is a diagram shown for explaining the outline of a mechanism provided to allow the data storage apparatus to specify whether or not a shadow MBR should be deleted according to the third embodiment.

FIG. 15 is a diagram shown for explaining the outline of the shadow MBR.

FIG. 18 is a diagram showing examples of commands related to the transition of the state of the data storage apparatus and the authority to issue the commands according to the fourth embodiment.

DETAILED DESCRIPTION

In general, according to one embodiment, a data storage apparatus includes a nonvolatile memory and a hardware processor. The hardware processor is configured to protect data on the nonvolatile memory by encryption in a first mode for a first intended purpose or a second mode for a second intended purpose. The hardware process is configured to: store a first default image, a second default image and a third default image, the first default image being for reproducing a first state which is an initial state where the data storage apparatus is set to neither the first mode nor the second mode and a data protection function is not activated, the second default image being for reproducing a second state which is an initial state in the first mode where the data protection function is not activated, the third default image being for reproducing a third state which is an initial state in the second mode where the data protection function is not activated; perform a first process for causing the data storage apparatus to transition from the first state to the second state with the stored second default image in response to a first command for a request to set the first mode in the first state; and perform a second process for causing the data storage apparatus to transition from the first state to the third state with the stored third default image in response to a second command for a request to set the second mode in the first state. Embodiments will be described hereinafter with reference to the accompanying drawings.

First Embodiment

A first embodiment is explained.

Figure 1:
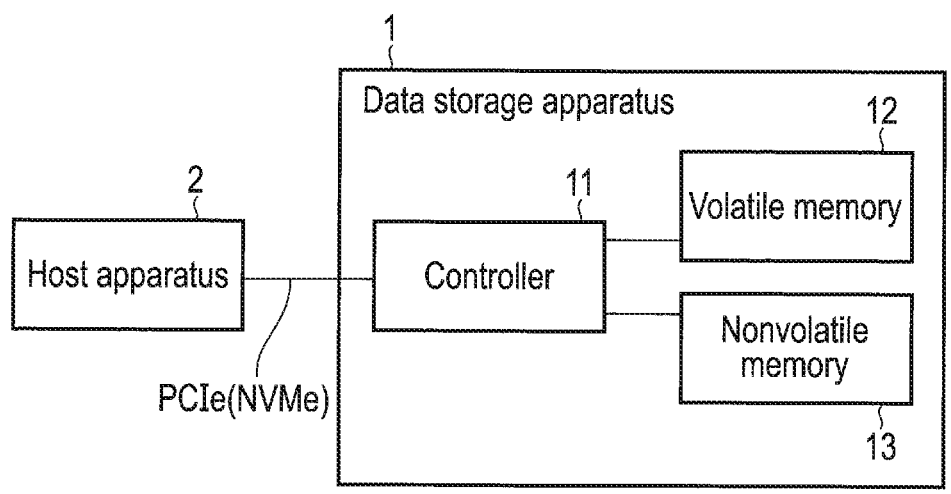
FIG. 1 is a diagram showing an example of the configuration of a data storage apparatus according to a first embodiment.

FIG. 1 is a diagram showing an example of the configuration of a data storage apparatus 1 according to the present embodiment. The data storage apparatus 1 is storage comprising an encryption function, and may be realized as, for example, an SSD or an HDD. As shown in FIG. 1, the data storage apparatus 1 comprises a controller 11, a volatile memory 12 and a nonvolatile memory 13.

The controller 11 is a processing circuit which receives a read or write command from a host device 2 and reads data requested from the host device 2 from the nonvolatile memory 13 or writes data transmitted from the host device 2 to the nonvolatile memory 13, using the volatile memory 12 as a cache. The cache may be provided in the controller 11. Thus, the volatile memory 12 is not essential. In addition to the cache, the volatile memory 12 may be used as, for example, the load destination of a program from the nonvolatile memory 13 and the work area of the program.

When data is written to the nonvolatile memory 13, the controller 11 encrypts the data with an encryption key. When data is read from the nonvolatile memory 13, the controller 11 decrypts the encrypted data with the same encryption key used for encryption. By updating the encryption key, the controller 11 is capable of invalidating the entire data on the nonvolatile memory 13 instantly. The controller 11 updates the encryption key by, for example, generating random numbers and replacing the value of the encryption key by the generated random numbers. The controller 11 performs this data protection by encryption in an enterprise mode (first mode) or an opal mode (second mode). The enterprise mode is a mode which is set when the data storage apparatus 1 is used for a server mainly targeted to companies. The opal mode is a mode which is set when the data storage apparatus 1 is used for a PC. For example, the enterprise mode is a mode which operates in accordance with the Trusted Computing Group (TCG) Enterprise SSC standard. The opal mode is a mode which operates in accordance with the TCG Opal SSC standard. Thus, the data storage apparatus 1 of the present embodiment can be used for either a server or a PC. This respect is explained in detail below.

The enterprise mode and the opal mode have differences between them. For example, a function for constructing an authentication mechanism (Shadow MBR) at the time of activation is essential for the opal mode. However, this function is unnecessary in the enterprise mode. In the opal mode, it is possible to unlock the user area and erase the data of the user area by administrative privileges. In the enterprise mode, it is impossible to unlock the user area even by administrative privileges (only erase is possible). Thus, only data erase is possible in the enterprise mode.

The volatile memory 12 is, for example, a dynamic RAM (DRAM). The nonvolatile memory 13 is, for example, a NAND flash memory or a hard disk.

The data storage apparatus 1 is connected to the host device 2 in accordance with, for example, the SCSI interface, ATA interface, NVM express (NVMe [registered trademark]) or e-MMC interface defined in the TCG Storage interface Interactions Specification (SIIS). In the example of FIG. 1, the data storage apparatus 1 is connected to the host device 2 in accordance with the NVMe (registered trademark) interface.

The host device 2 may be a device configured to use the data storage apparatus 1 as storage and issue a read or write request to the data storage apparatus 1. Here, the data storage apparatus 1 is assumed to be a mode-setting/mode-switching device which sets the data storage apparatus 1 to the enterprise mode, sets the data storage apparatus 1 to the opal mode, switches the data storage apparatus 1 from the enterprise mode to the opal mode and switch the data storage apparatus 1 from the opal mode to the enterprise mode.

Figure 2:
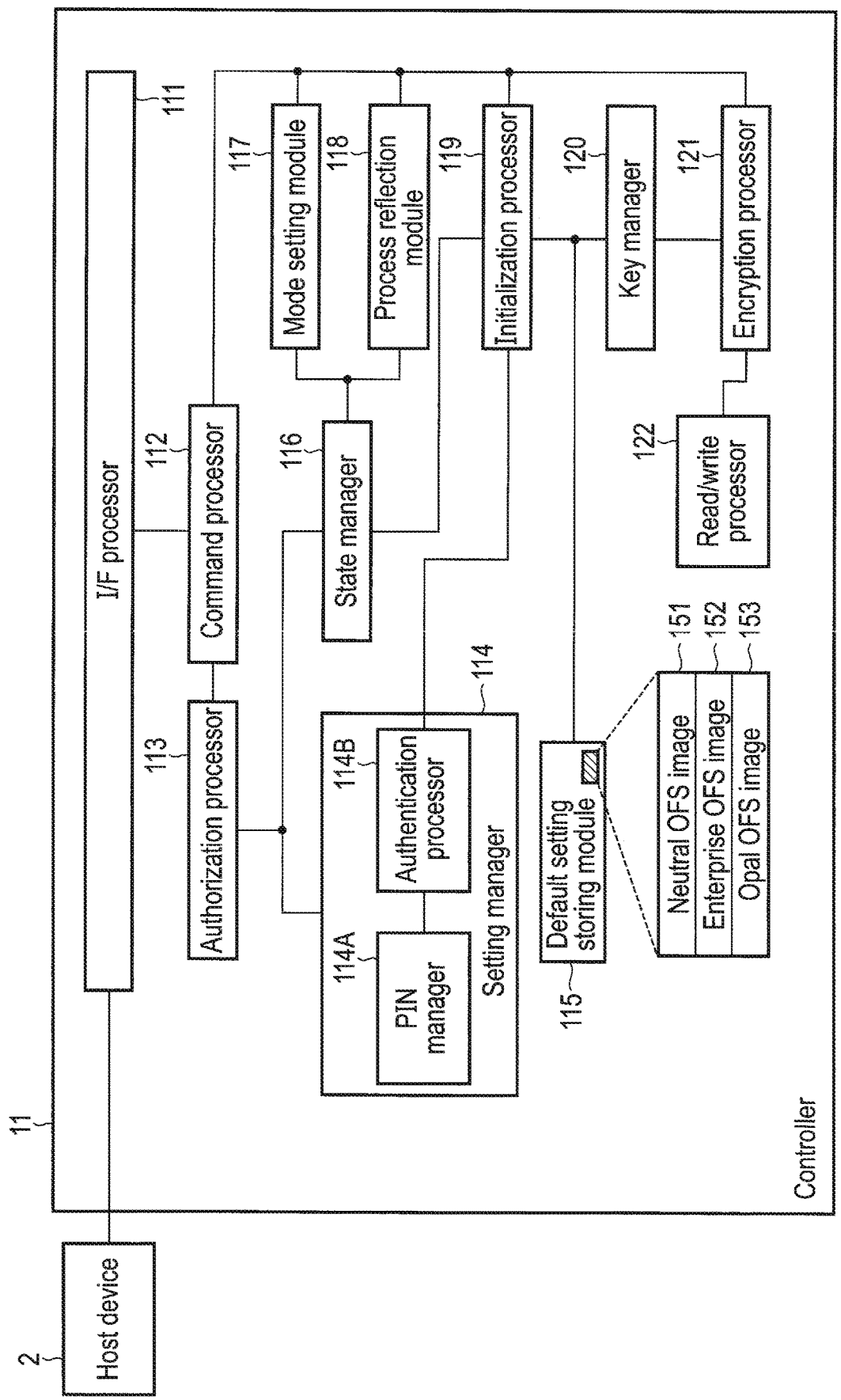
FIG. 2 is a diagram showing an example of the functional block of a controller provided in the data storage apparatus according to the first embodiment.

FIG. 2 is a diagram showing an example of the functional block of the controller 11.

As shown in FIG. 2, the controller 11 comprises an interface processor 111, a command processor 112, an authorization processor 113, a setting manager 114 and a default setting storage module 115. The controller 11 further comprises a state manager 116, a mode setting module 117, a process reflection module 118, an initialization processor 119 and a key manager 120. The controller 11 further comprises an encryption processor 121 and a read/write processor 122.

In the predetermined area of the nonvolatile memory 13 shown in FIG. 1, a program for causing the controller 11 to execute various procedures is stored. The program is partially or entirely loaded into the volatile memory 12 shown in FIG. 1 (or the volatile memory provided in the controller 11 and also used as a cache) by the processor provided in the controller 11 when, for example, the data storage apparatus 1 boots. The processor of the controller 11 executes the program on the volatile memory 12. By the description of the program, it is possible to construct, in the controller 11, various processors including the processors shown in FIG. 2.

To facilitate the understanding of the processors of the controller 11, the present embodiment explains the outline of a mechanism provided to allow the data storage apparatus 1 to be used for either a server or a PC according to the present embodiment, with reference to FIG. 3.

Firstly, the data storage apparatus 1 of the present embodiment adds a neutral original factory state (neutral OFS: a first state) S1 and an enterprise original factory state (enterprise OFS: a second state) S2, as the states applicable to the data storage apparatus 1, in other words, the states which can be managed by the data storage apparatus 1.

The neutral OFS is an inactive state where the data storage apparatus 1 is set to neither the enterprise mode nor the opal mode. For example, the neutral OFS is the initial state at the time of shipping. The enterprise OFS is the initial state in the enterprise mode.

An opal original factory state (opal OFS: a third state) S3 and an opal active state (a fifth state) S5 are the existing states defined in the TCG opal SSC standard and applicable to the data storage apparatus 1, in other words, the existing states which can be managed by the data storage apparatus 1. The opal OFS is the initial state (shipping state) in the opal mode. The opal active state is the state in operation in the opal mode. An enterprise active state (a fourth state) S4 is the state in operation in the enterprise mode. In the conventional technology, the data storage apparatus 1 is manufactured as a product for a server or a PC. A product for a server is shipped out in the enterprise active state where setting is applied in accordance with the request from the customer. A product for a PC is shipped out in the opal OFS where the customer performs setting. In the conventional technology, when the data storage apparatus 1 is manufactured and shipped out as a product for a PC, the data storage apparatus 1 holds only an initial image (default setting) for returning to the opal OFS (in other words, for reproducing the opal OFS). In contrast, the data storage apparatus 1 of the present embodiment to which the neutral OFS and the enterprise OFS are added holds a plurality of initial images including an initial image for the neutral OFS, an initial image for the enterprise OFS and an initial image for the opal OFS. Each initial image is, for example, a firmware (program) image to which predetermined default setting is applied. Alternatively, each initial image may be a setting file in which predetermined default setting is stored.

In the initial images of the enterprise OFS and the opal OFS, for example, a generic specification image and a customized specification image may be exclusively and selectively present. In the generic specification image, the default setting determined by the manufacturer or distributor is applied. In the customized specification image, default setting is applied in accordance with the request from the customer. For example, in the enterprise OFS, the number of users is different (from the number of users of the generic specification image). In the opal OFS, the default value of the administrator personal identification number (PIN) (for example, the value described in the manual in the generic specification) is changed to the value of the owner PIN at that time. In each of the enterprise OFS and the opal OFS, both of the initial images of the generic and customized specifications may be held, and one of them may be selected to be used.

Secondly, the data storage apparatus 1 of the present embodiment comprises a new command (enterprise mode: a first command b1) for setting the enterprise mode in the neutral OFS and causing the data storage apparatus 1 to transition to the enterprise OFS, a new command (opal mode: a second command b2) for setting the opal mode in the neutral OFS and causing the data storage apparatus 1 to transition to the opal OFS, and a new command (neutral revert: a seventh command b3) for causing the data storage apparatus 1 to transition from the enterprise active state or the opal active state to the neutral OFS. Further, the data storage apparatus 1 of the present embodiment comprises a new command (activate [enterprise]: a third command b11) for causing the data storage apparatus 1 to transition from the enterprise OFS to the enterprise active state, and a new command (revert [enterprise]: a fifth command b12) for causing the data storage apparatus 1 to transition from the enterprise active state to the enterprise OFS.

Activate (enterprise) and revert (enterprise) commands and existing activate and revert commands described later may be used in common. More specifically, when an activate command is issued in the enterprise OFS, the command may be interpreted as an activate (enterprise) command. When an activate command is issued in the opal OFS, the command may be interpreted as an existing activate command. When a revert command is issued in the enterprise active state, the command may be interpreted as a revert (enterprise) command. When a revert command is issued in the opal active state, the command may be interpreted as an existing revert command.

The "(w/param)" of an enterprise mode (w/param) command indicates that an enterprise mode command is issued with a parameter. For example, when both the generic specification image and the customized specification image are held as the initial images of the enterprise OFS, a parameter may be used to specify and select the specification image to be used.

Further, the data storage apparatus 1 of the present embodiment defines authority dedicated to the issuance of an enterprise mode command, an opal mode command and a neutral revert command. The types of authority are explained later. In the enterprise mode, in addition to an administrator PIN (Admin PIN) and a user PIN (User PIN), a dedicated PIN is defined. In the opal mode, in addition to an owner PIN (SID PIN), an administrator PIN (Admin PIN) and a user PIN (User PIN), a dedicated PIN is defined. The authority to issue activate (enterprise) and revert (enterprise) commands is given to an administrator PIN. A dedicated PIN is preferably unchangeable, or changeable only under certain conditions.

A command (active: a fourth command b13) for causing the data storage apparatus 1 to transition from the opal OFS to the opal active state and a command (revert: a sixth command b14) for causing the data storage apparatus 1 to transition from the opal active state to the opal OFS are, for example, the existing commands defined in the TCG Opal SSC standard. The authority to issue these commands is given to an owner PIN.

In all the cases where the data storage apparatus I transitions to the enterprise OFS by a revert (enterprise) command, transitions to the opal OFS by a revert command and transitions to the neutral OFS by a neutral revert command, data is invalidated by updating an encryption key, and further, the PINs managed in the state (in the enterprise mode or opal mode) at that time are initialized.

Thus, the data storage apparatus 1 of the present embodiment may be used for a server by setting the enterprise mode in the shipping state (neutral OFS), and may be also used for a PC by setting the opal mode in the shipping state (neutral OFS). Further, in the data storage apparatus 1 of the present embodiment, the state which has been used for a server may be restored to the shipping state (neutral OFS) such that the data storage apparatus 1 can be diverted to a PC. The state which has been used for a PC may be restored to the shipping state (neutral OFS) such that the data storage apparatus 1 can be diverted to a server. By defining dedicated authority, the mode switching by the entity other than the authorized entity can be restricted.

In consideration of the above explanation, the processors of the controller 11 are explained with reference to FIG. 2 again.

The interface processor 111 communicates with the host device 2 in accordance with a protocol compliant with, for example, the NVMe (registered trademark) standard. More specifically, the interface processor 111 receives a command issued from the host device 2 and transmits the command to the command processor 112. The interface processor 111 receives the result of a process corresponding to the command and transmits the result to the host device 2.

The command processor 112 transmits the command received from the interface processor 111 to the authorization processor 113. The authorization processor 113 determines whether the operator of the host device 2 is authorized to issue the command, and notifies the command processor 112 of the result. When the command processor 112 receives notification indicating that the operator has been authorized from the authorization processor 113, the command processor 112 transmits the command received from the interface processor 111 to the processor which performs a process corresponding to the command.

The authorization processor 113 determines the success or fail of a command based on whether authentication succeeds with the PIN corresponding to which authority to issue the command is given. The authentication with the PIN is performed by an authentication processor 114B provided in the setting manager 114. The setting manager 114 comprises a PIN manager 114A. The authentication processor 114B performs authentication based on the PINs managed by the PIN manager 114A. FIG. 4 shows the types of PINs managed by the PIN manager 114A.

As shown in FIG. 4, in the enterprise mode, the PIN manager 114A manages an administrator PIN, a dedicated PIN and a user PIN. The dedicated PIN is a newly defined PIN to which the authority to issue the above neutral revert command is given. In the opal mode, the PIN manager 114A manages an owner PIN, an administrator PIN, a dedicated PIN and a user PIN. This dedicated PIN is also a newly defined PIN to which the authority to issue the above neutral revert command is given. When the data storage apparatus 1 is set to neither the enterprise mode nor the opal mode, in other words, when the data storage apparatus 1 is in a neutral OFS, the PIN manager 114A manages at least a dedicated PIN. The dedicated PIN is a newly defined PIN to which the authority to issue the above enterprise mode, opal mode and neutral revert commands is given. In this way, the PIN manager 114A of the data storage apparatus 1 of the present embodiment comprises an additional function to further manage a dedicated PIN.

The PINs other than a dedicated PIN can be changed by issuing a command from the host device 2. This command is also transmitted to the authorization processor 113 via the interface processor 111 and the command processor 112 such that the success or fail of the authentication in order to invoke the command is determined. When the authentication succeeds, the command is transmitted to the setting manager 114. The PINs managed by the PIN manager 114A are changed. The manufacturer or distributor of the data storage apparatus 1 notifies only the specific person on the customer side of the value of the dedicated PIN. Alternatively, the value of the dedicated PIN is managed by the manufacturer or distributor of the data storage apparatus 1. The dedicated PIN may be changed only when the data storage apparatus 1 is in a neutral OFS.

The authentication with a PIN is performed in connection with the issuance of a command from the host device 2. The command is transmitted to the authorization processor 113 via the interface processor 111 and the command processor 112 and is further transmitted from the authorization processor 113 to the setting manager 114 such that the authentication processor 114B performs authentication based on the PINs managed by the PIN manager 114A. For example, the authentication processor 114B prompts the operator of the host device 2 to input a PIN, compares the input PIN with the PINs managed by the PIN manager 114A and authenticates the operator of the host device 2.

FIG. 5 shows examples of commands related to the transition of the state of the data storage apparatus 1 and the authority to issue the commands according to the present embodiment.

In FIG. 5, (A) shows commands issued in a neutral OFS where the data storage apparatus 1 is set to neither the enterprise mode nor the opal mode. (B) shows commands issued in the enterprise mode. (C) shows commands issued in the opal mode.

Symbols b1 to b3 and b11 to b14 of FIG. 5 correspond to symbols b1 to b3 and b11 to b14 of FIG. 3. As described above, an enterprise mode command b1, an opal mode command b2, a neutral revert command b3, a revert (enterprise) command b12 and an activate (enterprise) command b11 are new commands. The authority to issue an enterprise mode command b1, an opal mode command b2 and a neutral revert command b3 is given to the dedicated PIN. The authority to issue a revert (enterprise) command b12 and an activate (enterprise) command b11 is given to the administrator PIN. A revert command b14 and an activate command b13 are, for example, the existing commands defined in the TCG opal SSC standard. The authority to issue these commands is given to the owner PIN. For example, when an enterprise mode command b1 is issued, and further only when authentication succeeds with the dedicated PIN, the authorization processor 113 determines that the enterprise mode can be applied.

The default setting storage module 115 holds a neutral OFS image 151, an enterprise OFS image 152 and an opal OFS image 153. The neutral OFS image 151 is an initial image for the above neutral OFS for causing the data storage apparatus 1 to transition to a neutral OFS (in other words, for reproducing a neutral OFS) by issuing a neutral revert command. The enterprise OFS image 152 is an initial image for the above enterprise OFS for causing the data storage apparatus 1 to transition to an enterprise OFS (in other words, for reproducing an enterprise OFS) by issuing an enterprise mode command or a revert (enterprise) command. The opal OFS image 153 is an initial image for the above opal OFS for causing the data storage apparatus 1 to transition to an opal OFS (in other words, for reproducing an opal OFS) by issuing an opal mode command or a revert command. Thus, the default setting storage module 115 of the data storage apparatus 1 of the present embodiment holds the initial images of both an enterprise OFS and an opal OFS.

Figure 6:
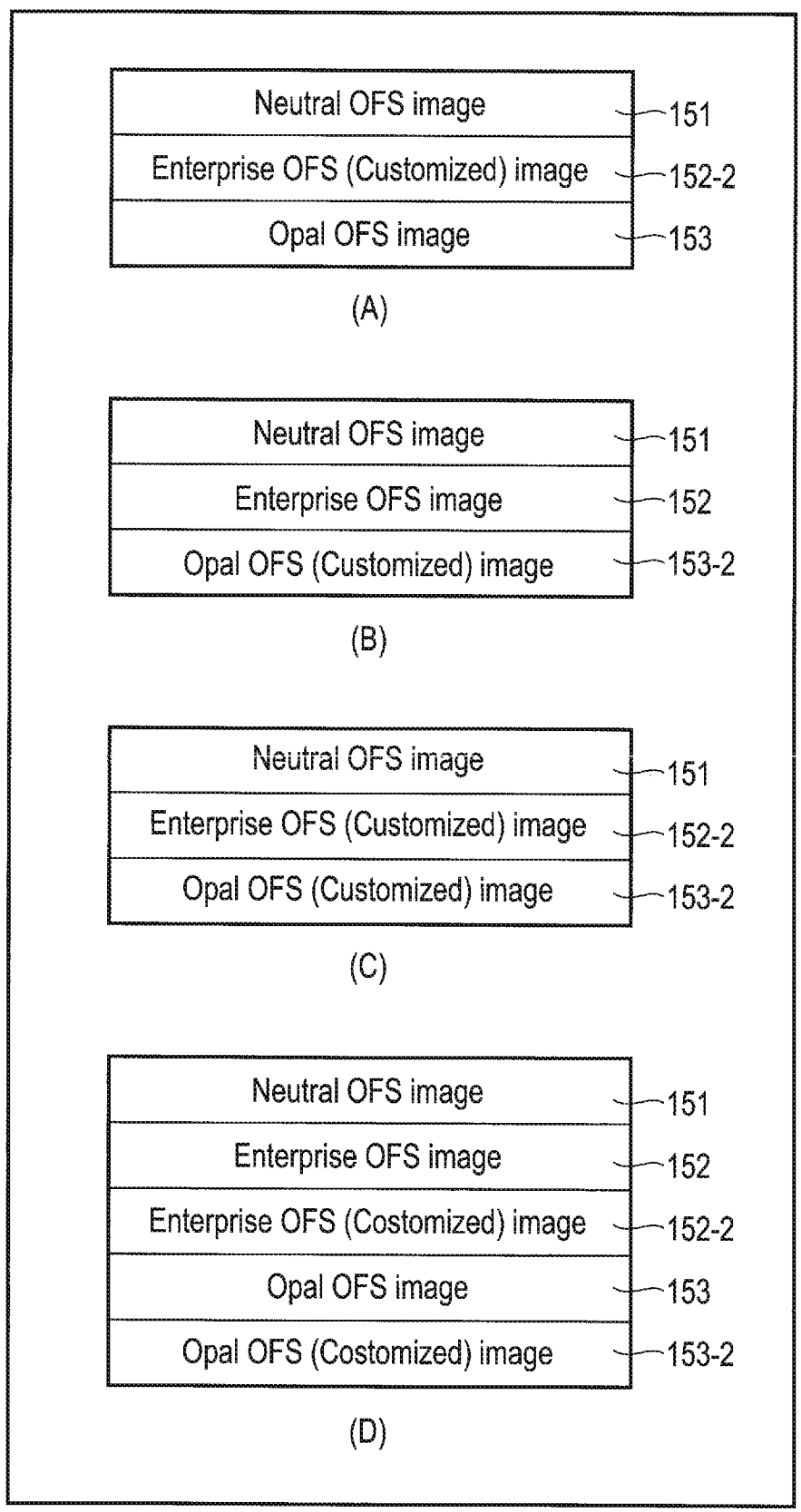
FIG. 6 is a diagram showing a variety of patterns of initial images held in the data storage apparatus according to the first embodiment.

As described above, in the initial images of an enterprise OFS and an opal OFS, the generic specification and the customized specification may be exclusively and selectively present. Alternatively, both of them may be present such that they can be exclusively and selectively used. The enterprise OFS image 152 and the opal OFS image 153 shown in FIG. 2 are generic initial images. Thus, the initial images held in the default setting storage module 115 are not limited to the neutral OFS image 151, the enterprise OFS image 152 and the opal OFS image 153. For example, as shown in FIG. 6, the following situations may be considered. (A) The default setting storage module 115 may hold the neutral OFS image 151, an enterprise OFS (customized) image 152-2 which is the customized initial image of an enterprise OFS, and the opal OFS image 153. (B) The default setting storage module 115 may hold the neutral OFS image 151, the enterprise OFS image 152, and an opal OFS (customized) image 153-2 which is the customized initial image of an opal OFS. (C) The default setting storage module 115 may hold the neutral OFS image 151, the enterprise OFS (customized) image 152-2 and the opal OFS (customized) image 153-2. (D) The default setting storage module 115 may hold the neutral OFS image 151, the enterprise OFS image 152, the enterprise OFS (customized) image 152-2, the opal OFS image 153, and the opal OFS (customized) image 153-2.

The state manager 116 manages the current state of the data storage apparatus 1 regarding which state is currently applied to the data storage apparatus 1, specifically, a neutral OFS, an enterprise OFS, an opal OFS, an enterprise active state or an opal active state. Thus, the state manager 116 of the data storage apparatus 1 of the present embodiment comprises an additional function to further manage a neutral OFS and an enterprise OFS.

When an enterprise mode command or an opal mode command is issued, and further when the authorization processor 113 determines that its execution is permitted, the mode setting module 117 performs a process corresponding to the enterprise mode command or the opal mode command transmitted from the command processor 112. More specifically, the mode setting module 117 performs a process (a first process) for causing the data storage apparatus 1 to transition from a neutral OFS to an enterprise OFS or a process (a second process) for causing the data storage apparatus 1 to transition from a neutral OFS to an opal OFS. When the state managed by the state manager 116 is not a neutral OFS, the authorization processor 113 notifies the command processor 112 of an error. When the transition from a neutral OFS to an enterprise OFS or an opal OFS is completed, the mode setting module 117 notifies the state manager 116 of the transition of the state and notifies the command processor 112 of the completion of the process. The mode setting module 117 is a processor unique to the data storage apparatus 1 of the present embodiment.

When an activate (enterprise) command or an activate command is issued, and further when the authorization processor 113 determines that its execution is permitted, the process reflection module 118 performs a process corresponding to the activate (enterprise) command or the activate command transmitted from the command processor 112. More specifically, the process reflection processor 118 performs a process (a third process) for causing the data storage apparatus 1 to transition from an enterprise OFS to an enterprise active state or a process (a fourth process) for causing the data storage apparatus 1 to transition from an opal OFS to an opal active state. When the state managed by the state manager 116 is not an enterprise OFS (in a case where an activate [enterprise] command is issued), or is not an opal OFS (in a case where an activate command is issued), the authorization processor 113 notifies the command processor 112 of an error. When the transition from an enterprise OFS to an enterprise active state or the transition from an opal OFS to an OFS active state is completed, the mode setting module 117 notifies the state manager 116 of the transition of the state, and notifies the command processor 112 of the completion of the process. Thus, the process reflection module 118 of the data storage apparatus 1 of the present embodiment comprises an additional function to perform a process for causing the data storage apparatus 1 to transition from an enterprise OFS to an enterprise active state in accordance with an activate (enterprise) command.

When a revert (enterprise), revert or neutral revert command is issued, and further when the authorization processor 113 determines that its execution is permitted, the initialization processor 119 performs a process corresponding to the revert (enterprise), revert or neutral revert command transmitted from the command processor 112. More specifically, the initialization processor 119 performs a process (a fifth process) for causing the data storage apparatus 1 to transition from an enterprise active state to an enterprise OFS, a process (a sixth process) for causing the data storage apparatus 1 to transition from an opal active state to an opal OFS or a process (a seventh process) for causing the data storage apparatus 1 to transition from an enterprise active state or an opal active state to a neutral OFS, using the initial images held in the default setting storage module 115. When the state managed by the state manager 116 is not an enterprise active state (in a case where a revert [enterprise] command is issued), or is not an opal active state (in a case where a revert command is issued), the authorization processor 113 notifies the command processor 112 of an error (in a case a neutral revert command is issued, when the data storage apparatus 1 is in neither an enterprise active state nor an opal active state). When the transition from an enterprise active state to an enterprise OFS or a neutral OFS or the transition from an opal active state to an opal OFS or a neutral OFS is completed, the mode setting module 117 notifies the state manager 116 of the transition of the state and notifies the command processor 112 of the completion of the process. Thus, the initialization processor 119 of the data storage apparatus 1 of the present embodiment comprises an additional function to perform a process for causing the data storage apparatus 1 to transition from an enterprise active state or an opal active state to a neutral OFS in accordance with a neutral revert command. The initialization processor 119 of the data storage apparatus 1 of the present embodiment comprises an additional function to perform a process for causing the data storage apparatus 1 to transition from an enterprise active state to an enterprise OFS in accordance with a revert (enterprise) command.

When the initialization processor 119 causes the data storage apparatus 1 to transition to a neutral OFS, an enterprise OFS or an opal OFS, the initialization processor 119 instructs the key manager 120 which manages an encryption key to update the encryption key to invalidate the data on the nonvolatile memory 13. When the encryption key is updated, the encrypted data stored in the nonvolatile memory 13 cannot be correctly decrypted. Thus, the entire data is invalidated instantly. After the encryption key is updated, data is encrypted, and the encrypted data is decrypted, using the updated encryption key. In this way, the updating of the encryption key does not make the data storage apparatus 1 unusable.

The encryption processor 121 uses the encryption key managed by the key manager 120 to perform a process for encrypting the data written to the nonvolatile memory 13 or decrypting the encrypted data read from the nonvolatile memory 13. The read/write processor 122 performs a process for reading data from the nonvolatile memory 13 or writing data to the nonvolatile memory 13.

Figure 7:
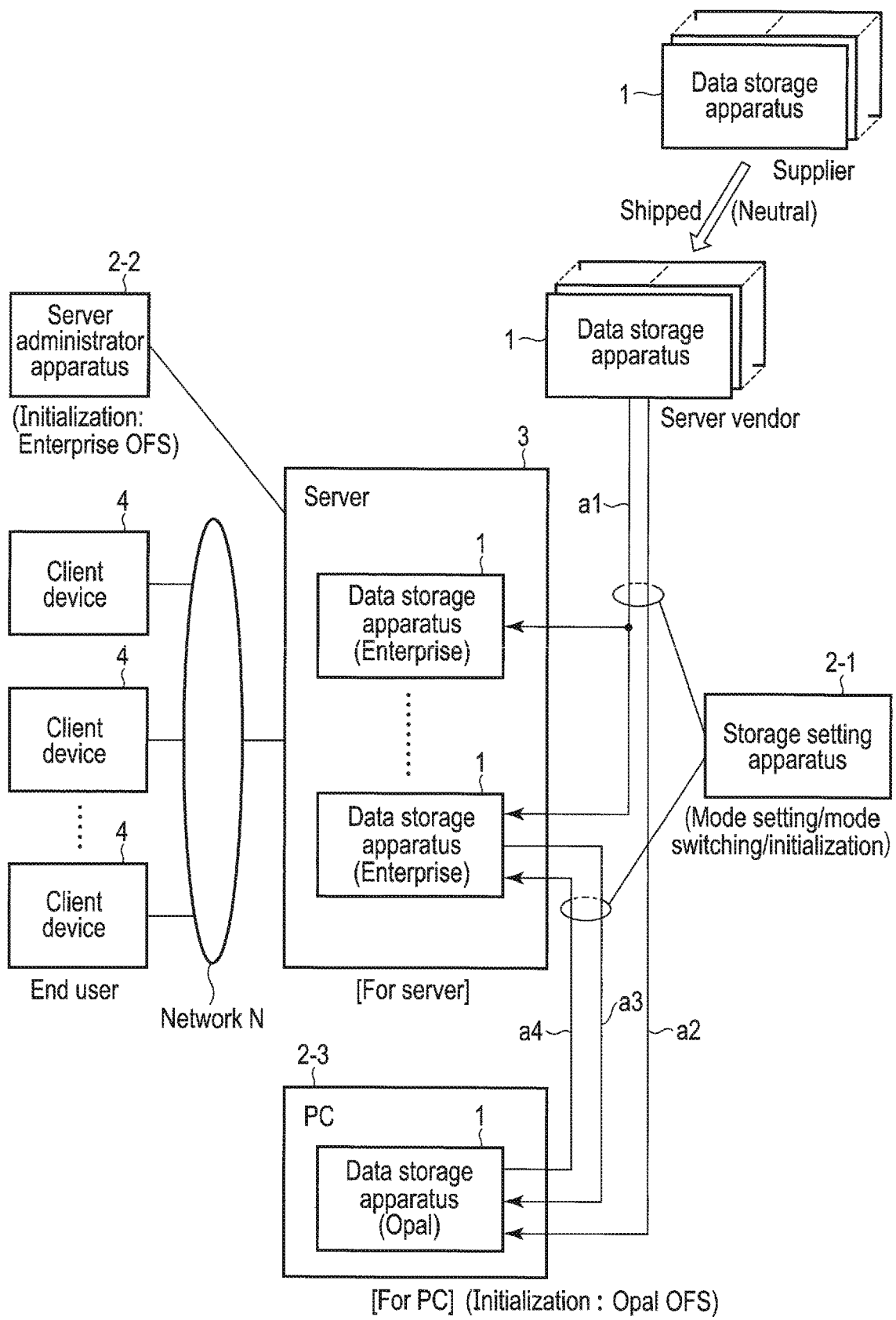
FIG. 7 is a first diagram shown for explaining a use case which can be assumed in the storage device according to the first embodiment.
Figure 8:
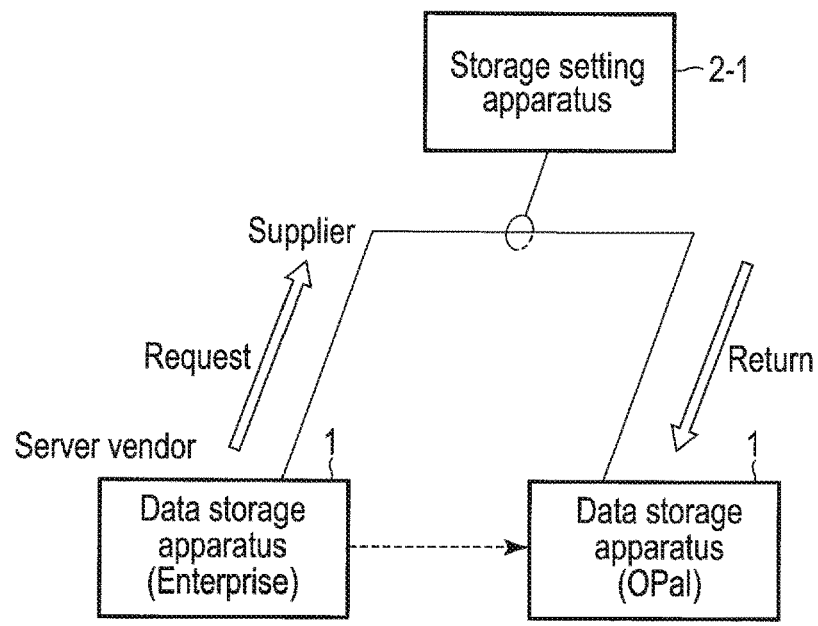
FIG. 8 is a second diagram shown for explaining a use case which can be assumed in the storage device according to the first embodiment.
Figure 9:
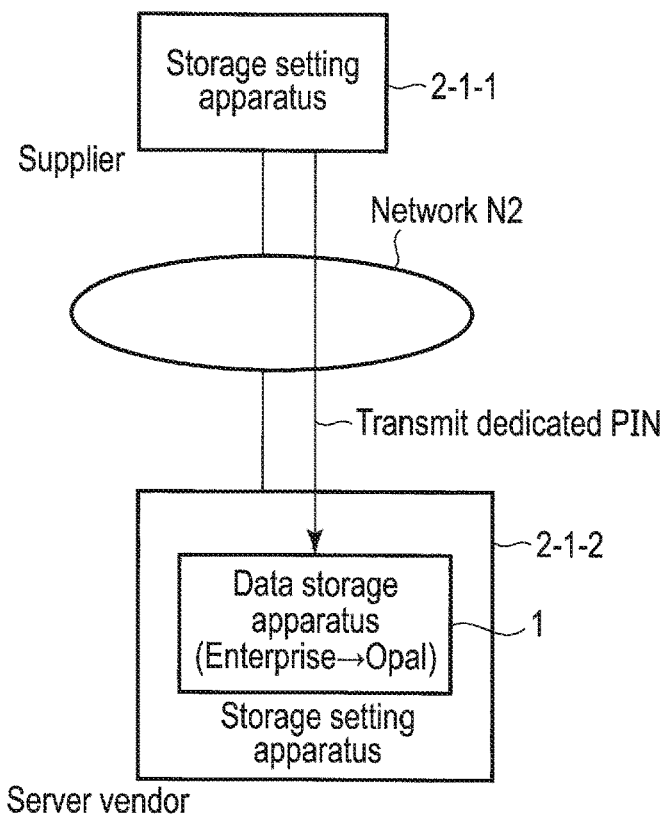
FIG. 9 is a third diagram shown for explaining a use case which can be assumed in the storage device according to the first embodiment.

Now, this specification explains a use case which can be assumed in the data storage apparatus 1 of the present embodiment having the above structure, referring to FIG. 7, FIG. 8 and FIG. 9.

It is assumed that a company (server vendor) which sells servers or PCs purchases the data storage apparatuses 1 from the manufacturer or distributor (supplier) of the data storage apparatuses 1 and applies the data storage apparatuses 1 to the servers or PCs to be sold.

In FIG. 7, a server 3 is a computer which is sold by the server vendor. For example, a large number of data storage apparatuses 1 are installed in a chassis of the server 3. Each client device 4 is a computer used by the employees (end users) of the company which purchases the server 3 from the server vendor and uses the server 3. A network N connects the server 3 and each client device 4, and is, for example, the Internet.

In FIG. 7, a storage setting apparatus 2-1 is, for example, a computer used by the inventory manager of the data storage apparatuses 1. A server administrator apparatus 2-2 is, for example, a computer used by the operation administrator of the server 3. A PC 2-3 is, for example, a computer sold by the server vendor such as a notebook computer. The storage setting apparatus 2-1 may issue an enterprise mode command, an opal mode command and a neutral revert command as the host device 2 shown in FIG. 1 and FIG. 2 (under the condition that authentication succeeds with the dedicated PIN). The server administrator apparatus 2-2 may issue an activate (enterprise) command and a revert (enterprise) command as the host device 2 shown in FIG. 1 and FIG, 2 (under the condition that authentication succeeds with the administrator PIN). The PC 2-3 may issue an activate command and a revert command as the host device 2 shown in FIG. 1 and FIG. 2 (under the condition that authentication succeeds with the owner PIN).

In the conventional technology, when the server vendor purchases the data storage apparatuses 1 from the supplier for the server 3 and the PC 2-3 and applies the data storage apparatuses 1, the server vendor needs to purchase the data storage apparatuses 1 or manage the stock of the data storage apparatuses 1 for the server 3 and the PC 2-3, separately. For example, the server vender needs to manage and control how many data storage apparatuses 1 should be purchased for the server 3, how many data storage apparatuses 1 should be purchased for the PC 2-3, how many data storage apparatuses 1 are held in stock for the server 3, and how many data storage apparatuses 1 are held in stock for the PC 2-3. However, in the present embodiment, each data storage apparatus 1 can be used for either the server 3 or the PC 2-3. Thus, the server vendor can purchase the data storage apparatuses 1 from the supplier altogether without distinguishing the use for the server 3 from the use for the PC The supplier does not need to manufacture two types of products (two types of data storage apparatuses 1) for servers and PCs.

Each data storage apparatus 1 is shipped out from the supplier in a neutral OFS. The supplier notifies the purchaser (for example, the inventory manager of the server vendor) of the value of the dedicated PIN of each shipped data storage apparatus 1. The inventory manager uses the dedicated PINs and causes the storage setting apparatus 2-1 to issue an enterprise mode command for each data storage apparatus 1 applied to the server 3 such that each data storage apparatus 1 is set to the enterprise mode and transitions to an enterprise OFS (a1). Further, the inventory manager uses the dedicated PIN and causes the storage setting apparatus 2-1 to issue an opal mode command for the data storage apparatus 1 applied to the PC 2-3 such that the data storage apparatus 1 is set to the opal mode and transitions to an opal OFS (a2).

Each data storage apparatus 1 installed in the server 3 in an enterprise OFS transitions to an enterprise active state in response to the issuance of an activate (enterprise) command from the server administrator apparatus 2-2 (which succeeds in authentication with the administrator PIN). Alternatively, each data storage apparatus 1 may be caused to transition to an enterprise active state by the storage setting apparatus 2-1 (which succeeds in authentication with the administrator PIN), and then the data storage apparatus 1 in an enterprise active state may be installed in the server 3. The server administrator apparatus 2-2 (which succeeds in authentication with the administrator PIN) is capable of issuing a revert (enterprise) command and causing each data storage apparatus 1 to transition to an enterprise OFS.

Similarly, the data storage apparatus 1 installed in the PC 2-3 in an opal OFS transitions to an active state in response to the issuance of an activate command from the PC 2-3 (which succeeds in authentication with the owner PIN). The PC 2-3 (which succeeds in authentication with the owner PIN) is capable of issuing a revert command and causing the data storage apparatus 1 to transition to an opal OFS.

For example, in the present embodiment, each data storage apparatus 1 used for the server 3 can be diverted to the PC 2-3 (a3). Conversely, the data storage apparatus 1 used for the PC 2-3 can be diverted to the server 3 (a4). In other words, the mode can be switched between the enterprise mode and the opal mode. Each data storage apparatus 1 used for the server 3 is removed from the server 3 in an enterprise active state to be diverted to the PC 2-3, and transitions to a neutral OFS in response to the issuance of a neutral revert command from the storage setting apparatus 2-1 (which succeeds in authentication with the dedicated PIN). Since the neutral OFS is the shipping state, the data storage apparatus 1 is installed in the PC 2-3 after it transitions to an opal OFS in the above procedure.

Similarly, the data storage apparatus 1 used for the PC 2-3 is removed from the PC 2-3 in an opal active state to be diverted to the server 3, and transitions to a neutral OFS in response to the issuance of a neutral revert command from the storage setting apparatus 2-1 (which succeeds in authentication with the dedicated PIN). After the transition to the neutral OFS, the data storage apparatus 1 transitions to an enterprise OFS or an enterprise active state in the above procedure, and is installed in the server 3.

The state of each data storage apparatus 1 shipped out from the supplier is not necessarily a neutral OFS. For example, a shipping order may be received from the server vendor separately for servers and PCs. Each data storage apparatus 1 in an enterprise OFS or an enterprise active state and each data storage apparatus 1 in an opal OFS may be delivered. For example, when the server vendor wants to divert a data storage apparatus 1 used for the server to the PC for some reason, as shown in FIG. 8, the data storage apparatus 1 may be collected from the server vendor, and the supplier may switch the data storage apparatus 1 from the enterprise mode to the opal mode by the storage setting apparatus 2-1 (which succeeds in authentication with the dedicated PIN), and return the storage device 1 to the server vendor. In this case, it is unnecessary to notify the server vendor of the value of the dedicated PIN. This is also applicable to a case where the server vendor wants to divert the data storage apparatus 1 for the PC to the server for some reason. When it is unnecessary to notify the server vendor of the values of dedicated PINs, the supplier does not need to manage the values of the dedicated PINs depending on the server vendor. In this way, the number of dedicated PINs to be managed can be considerably reduced.

For example, as shown in FIG. 9, a storage setting apparatus 2-1-1 on the supplier side may be connected to a storage setting apparatus 2-1-2 on the server vendor side via a network N2 such that the storage setting apparatus 2-1-1 on the supplier side can remotely access the data storage apparatus 1 installed in the storage setting apparatus 2-1-2 on the server vendor side. In this way, the dedicated PIN may be directly transmitted from the storage setting apparatus 2-1-1 on the supplier side to the data storage apparatus 1 (via the storage setting apparatus 2-1-2 on the server vendor side). In this case, for example, when the server vendor wants to divert a data storage apparatus 1 used for a server to a PC for some reason, it is unnecessary to notify the server vendor of the value of the dedicated PIN.

It is not necessary for the server vendor to be able to set or switch the mode of each data storage apparatus 1. Even in this case, the supplier does not need to manufacture two types of products for servers and PCs.

As described above, the data storage apparatus 1 of the present embodiment can be used for either servers or PCs.

Second Embodiment

A second embodiment is explained. The same structural elements as the first embodiment are denoted by the same reference numbers. Thus, overlapping descriptions are omitted.

Figure 10:
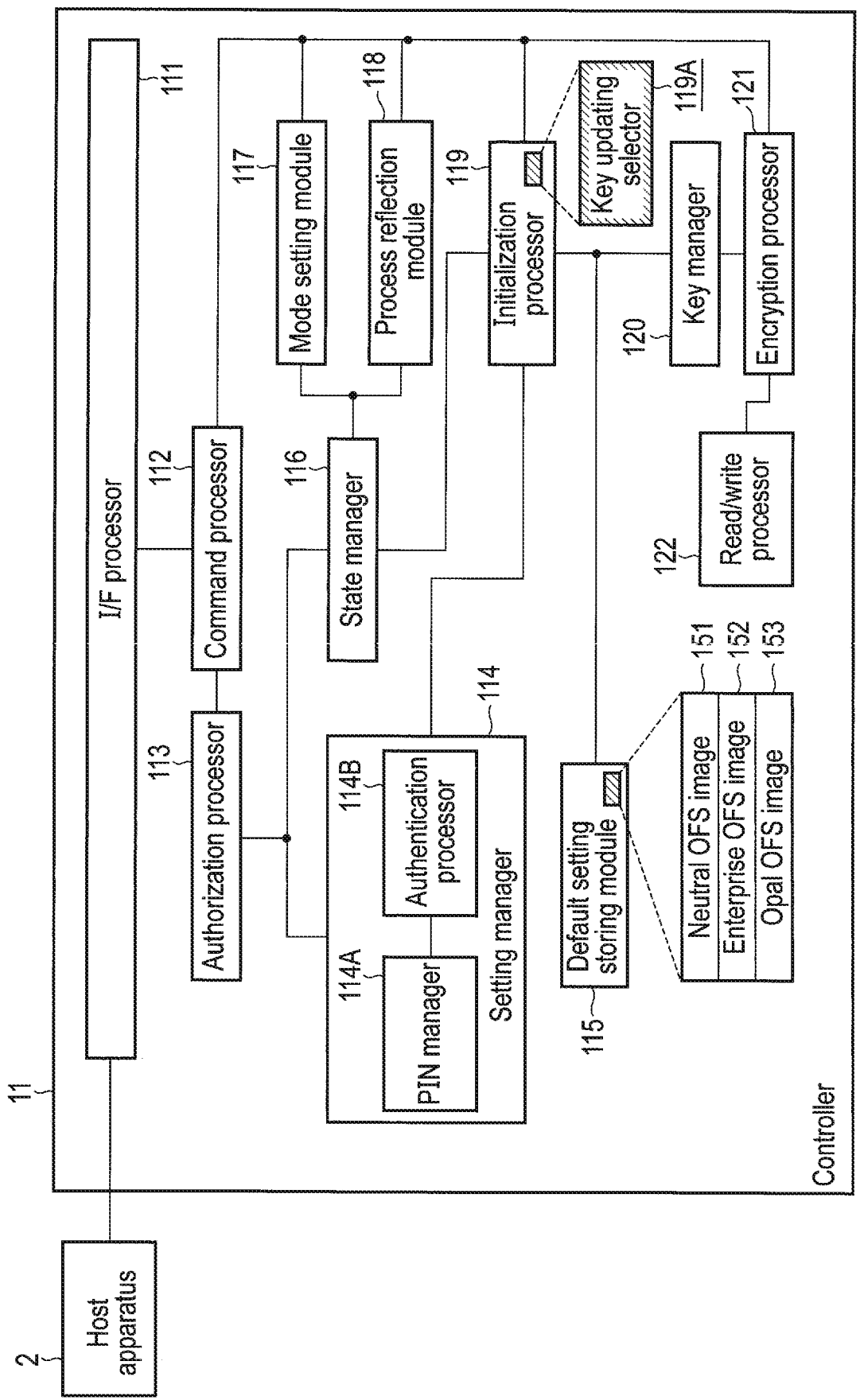
FIG. 10 is a diagram showing an example of the functional block of a controller provided in a data storage apparatus according to a second embodiment.

FIG. 10 is a diagram showing an example of the functional block of a controller 11 provided in a data storage apparatus 1 according to the present embodiment.

As shown in FIG. 10, the data storage apparatus 1 of the present embodiment comprises the controller 11 comprising an initialization processor 119 comprising a key updating selector 119A.

The key updating selector 119A is a processor provided to offer an option which does not invalidate data, in other words, which does not update an encryption key when the data storage apparatus 1 transitions from an enterprise active state to an enterprise OFS or from an opal active state to an opal OFS. In the data storage apparatus 1 of the present embodiment, for example, as shown in FIG. 11, as a command for the transition to an enterprise OFS, a RevertSP (enterprise) command b12-2 is newly provided. Further, as a command for the transition to an opal OFS, a RevertSP command b14-2 is newly provided. In a manner similar to that of FIG. 5, in FIG. 11, (A) shows commands issued in a neutral OFS where the data storage apparatus 1 is set to neither an enterprise mode nor an opal mode. (B) shows commands issued in the enterprise mode. (C) shows commands issued in the opal mode. When a RevertSP (enterprise) or RevertSP command is issued, the key updating selector 119A determines that an encryption key should not be updated. In a manner similar to that of activate (enterprise) and revert (enterprise) commands, a RevertSP (enterprise) command and a RevertSP command may be used in common. Thus, the key updating selector 119A may determine whether the command is a RevertSP (enterprise) command or a RevertSP command based on whether the data storage apparatus 1 is in an enterprise active state or an opal active state. Whether or not an encryption key should be updated may be specified by adding a parameter (w/param) to a revert (enterprise) or revert command instead of newly providing RevertSP (enterprise) and RevertSP commands.

When the key updating selector 119A determines that an encryption key should be updated, the initialization processor 119 instructs a key manager 120 to update the encryption key. When the key updating selector 119A determines that an encryption key should not be updated, the initialization processor 119 does not instruct the key manager 120 to update the encryption key.

By newly providing RevertSP (enterprise) and RevertSP commands, in the data storage apparatus 1 of the present embodiment, both the encryption key used in the enterprise mode and the encryption key used in the opal mode may be managed by the key manager 120. Thus, the key manager 120 of the data storage apparatus 1 of the present embodiment comprises an additional function to manage the two keys. When the initialization processor 119 instructs the key manager 120 to update an encryption key, the initialization processor 119 instructs the key manager 120 which encryption key should be updated. More specifically, when a RevertSP (enterprise) command is issued, and further when the state managed by a state manager 116 is an enterprise active state, the initialization processor 119 instructs the key manager 120 to update the encryption key used in the enterprise mode. When a RevertSP command is issued, and further when the state managed by the state manager 116 is an opal active state, the initialization processor 119 instructs the key manager 120 to update the encryption key used in the opal mode.

Figure 12:
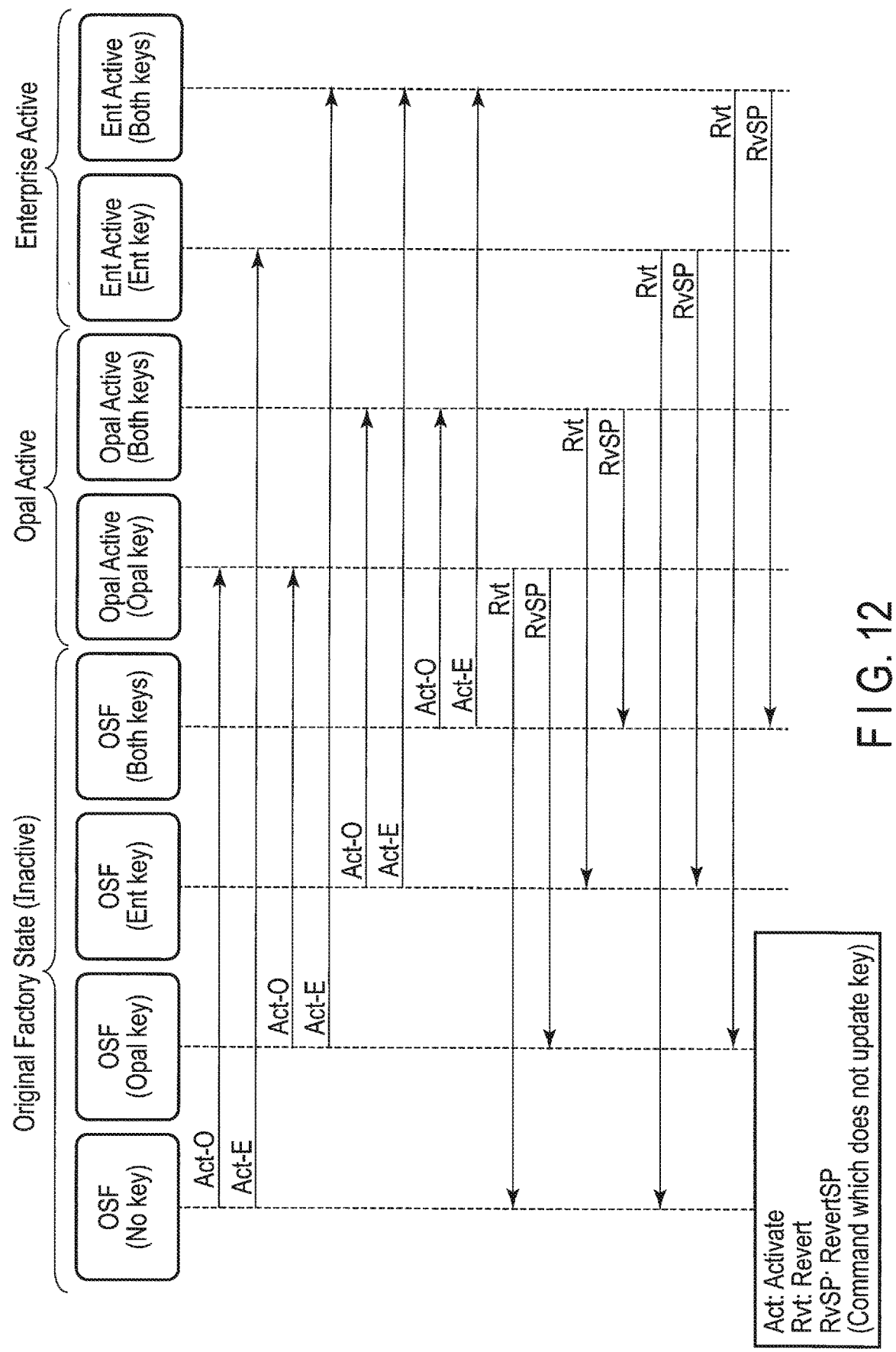
FIG. 12 is a diagram showing an example of the transition of the holding state of encryption keys in the data storage apparatus according to the second embodiment.

FIG. 12 shows an example of the transition of the holding state of encryption keys.

In FIG. 12, "Act-O" indicates an activate command, and "Act-E" indicates an activate (enterprise) command. Further, "Rvt" indicates a revert (enterprise) or revert command, and "RvSP" indicates a RevertSP (enterprise) or RevertSP command. "No key" indicates a state where neither the encryption key used in the opal mode nor the encryption key used in the enterprise mode is held. "Opal key" indicates a state where only the encryption key used in the opal mode is held. "Ent key" indicates a state where only the encryption key used in the enterprise mode is held. "Both keys" indicates a state where both the encryption key used in the opal mode and the encryption key used in the enterprise mode are held.

As shown in FIG. 12, when an activate (enterprise) command is issued in a state where the encryption key used in the enterprise mode is not held, the encryption key used in the enterprise mode is generated and held. Similarly, when an activate command is issued in a state where the encryption key used in the opal mode is not held, the encryption key used in the opal mode is generated and held. When an activate (enterprise) command is issued in a state where the encryption key used in the enterprise mode is held, the held encryption key is continuously held (used). Similarly, when an activate command is issued in a state where the encryption key used in the opal mode is held, the held encryption key is continuously held (used).

As shown in FIG. 12, when a RevertSP (enterprise) or RevertSP command is issued, no encryption key is updated, and the encryption key held at that time is continuously held. When a Revert (enterprise) command is issued, only the encryption key used in the enterprise mode is updated. When the encryption key used in the opal mode is held, the encryption key is continuously held. When a Revert command is issued, only the encryption key used in the opal mode is updated. When the encryption key used in the enterprise mode is held, the encryption key is continuously held.

When this option is offered, in the data storage apparatus 1 of the present embodiment, a data access after initialization (in other words, the transition to an enterprise OFS or an opal OFS) is allowed.

For example, it is assumed that a data storage apparatus 1 is used in the order of the opal mode, the enterprise mode and the opal mode. In the data storage apparatus 1, a nonvolatile memory 13 is assumed to be divided into a plurality of partitions such that the partitions to be used differ between the opal mode and the enterprise mode. In this case, for example, when the mode is switched such that the encryption key for the opal mode is not updated, the data stored in the nonvolatile memory 13 in the first round of the opal mode can be used for the second round of the opal mode (after the intervention of the enterprise mode).

Third Embodiment

A third embodiment is explained. The same structural elements as the first embodiment or the second embodiment are denoted by the same reference numbers. Thus, overlapping descriptions are omitted.

Figure 13:
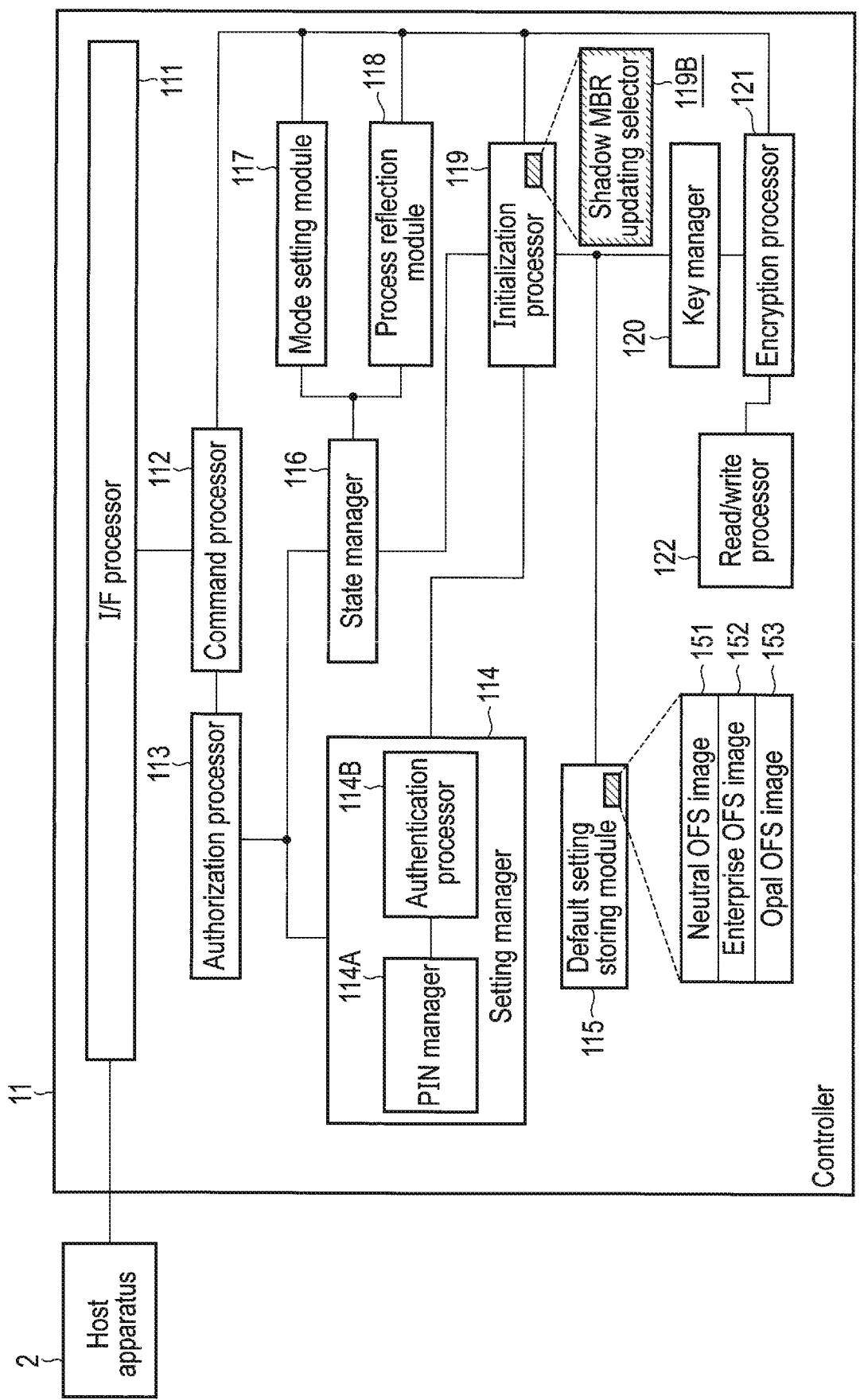
FIG. 13 is a diagram showing an example of the functional block of a controller provided in a data storage apparatus according to a third embodiment.

FIG. 13 is a diagram showing an example of the functional block of a controller 11 provided in a data storage apparatus 1 according to the present embodiment.

As shown in FIG. 13, the data storage apparatus 1 of the present embodiment comprises the controller 11 comprising an initialization processor 119 comprising a shadow MBR updating selector 119B.

As described above, a function for constructing a Shadow MBR is mandatory for the opal mode. The Shadow MBR is deleted when the data storage apparatus 1 is restored to an opal OFS. In this respect, the Shadow MBR updating selector 119B offers an option which does not delete the Shadow MBR when the data storage apparatus 1 is restored to an opal OFS. The deletion of the Shadow MBR indicates that the Shadow MBR is initialized (in other words, is zeroized). More specifically, the deletion of the Shadow MBR indicates that the data stored in the Shadow MBR is deleted to operate the program for performing pre-boot authentication.

For example, as shown in FIG. 14, a parameter may be added to a revert command for causing the data storage apparatus 1 to transition from an opal active state to an opal OFS such that whether or not the Shadow MBR should be deleted can be specified by the parameter (b14'). Alternatively, a command different from a revert command may be newly added such that whether or not the Shadow MBR should be deleted can be specified by selectively using the commands.

As the procedure of the initialization processor 119 when the Shadow MBR is not deleted, for example, the Shadow MBR may be saved, and the data storage apparatus 1 is initialized by an opal OFS image 153 stored in a default setting storage module 115. Subsequently, the saved Shadow MBR may be restored.

Now, the present embodiment explains the outline of the Shadow MBR with reference to FIG. 15.

A Shadow MBR 52 is constructed in the data storage apparatus 1 to perform authentication such as pre-boot authentication. When a host device 2 accesses an MBR (real MBR) 51 for the data storage apparatus 1 in which the Shadow MBR 52 is constructed, the access destination is converted to the Shadow MBR 52 (f1). The Shadow MBR 52 comprises an authentication program 52A. The authentication program 52A requests the host device 2 which tries to access the real MBR 51 to transmit, for example, a PIN. When the PIN transmitted from the host device 2 matches the PIN managed in the data storage apparatus 1, the authentication program 52A determines that the authentication succeeds, and starts the activation process of the real MBR 51 (f2). Thus, the connection between the host device 2 and the data storage apparatus 1 is established (f3).

When the data storage apparatus 1 is restored to an opal OFS, an option which does not delete the Shadow MBR is offered. Thus, in the data storage apparatus 1 of the present embodiment, the Shadow MBR constructed before the data storage apparatus 1 is restored to an opal OFS can be continuously used. In other words, it is possible to save the time to reconstruct (reconfigure) the Shadow MBR.

Fourth Embodiment

A fourth embodiment is explained. The same structural elements as the first to third embodiments are denoted by the same reference numbers. Thus, overlapping descriptions are omitted.

Figure 16:
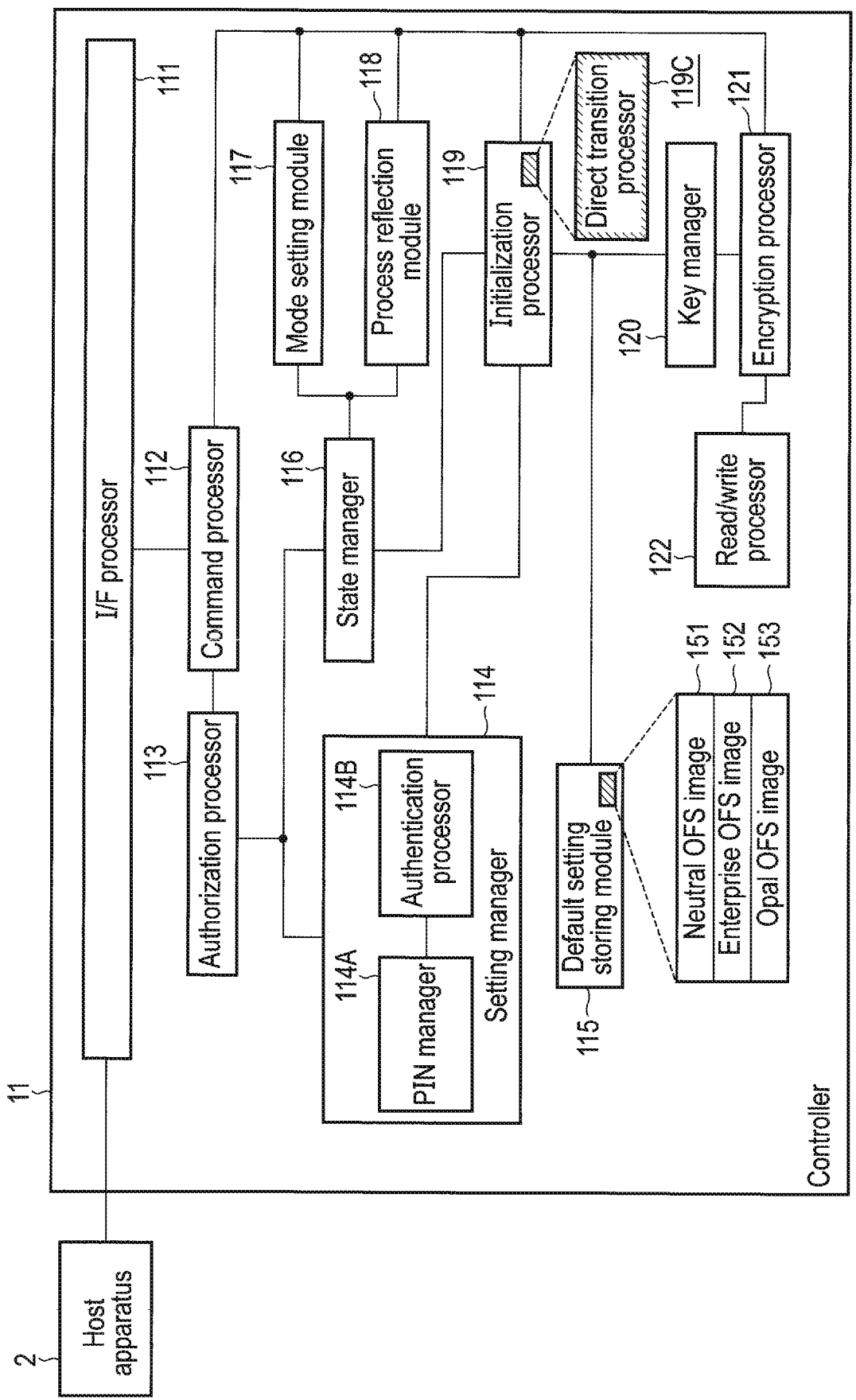
FIG. 16 is a diagram showing an example of the functional block of a controller provided in a data storage apparatus according to a fourth embodiment.

FIG. 16 is a diagram showing an example of the functional block of a controller 11 provided in a data storage apparatus 1 according to the present embodiment.

As shown in FIG. 16, the data storage apparatus 1 of the present embodiment comprises the controller 11 comprising an initialization processor 119 comprising a direct transition processor 119C.

In the first to third embodiments, when the mode is switched between an enterprise mode and an opal mode, a neutral OFS is interposed. More specifically, the enterprise mode is switched to the opal mode by issuing a neutral revert command in an enterprise active state, causing the data storage apparatus 1 to transition to a neutral OFS, issuing an opal mode command in the neutral OFS, and causing the storage device 1 to transition to an opal OFS. The opal mode is switched to the enterprise mode by issuing a neutral revert command in an opal active state, causing the data storage apparatus 1 to transition to a neutral OFS, issuing an enterprise mode command in the neutral OFS, and causing the data storage apparatus 1 to transition to an enterprise OFS.

Figure 17:
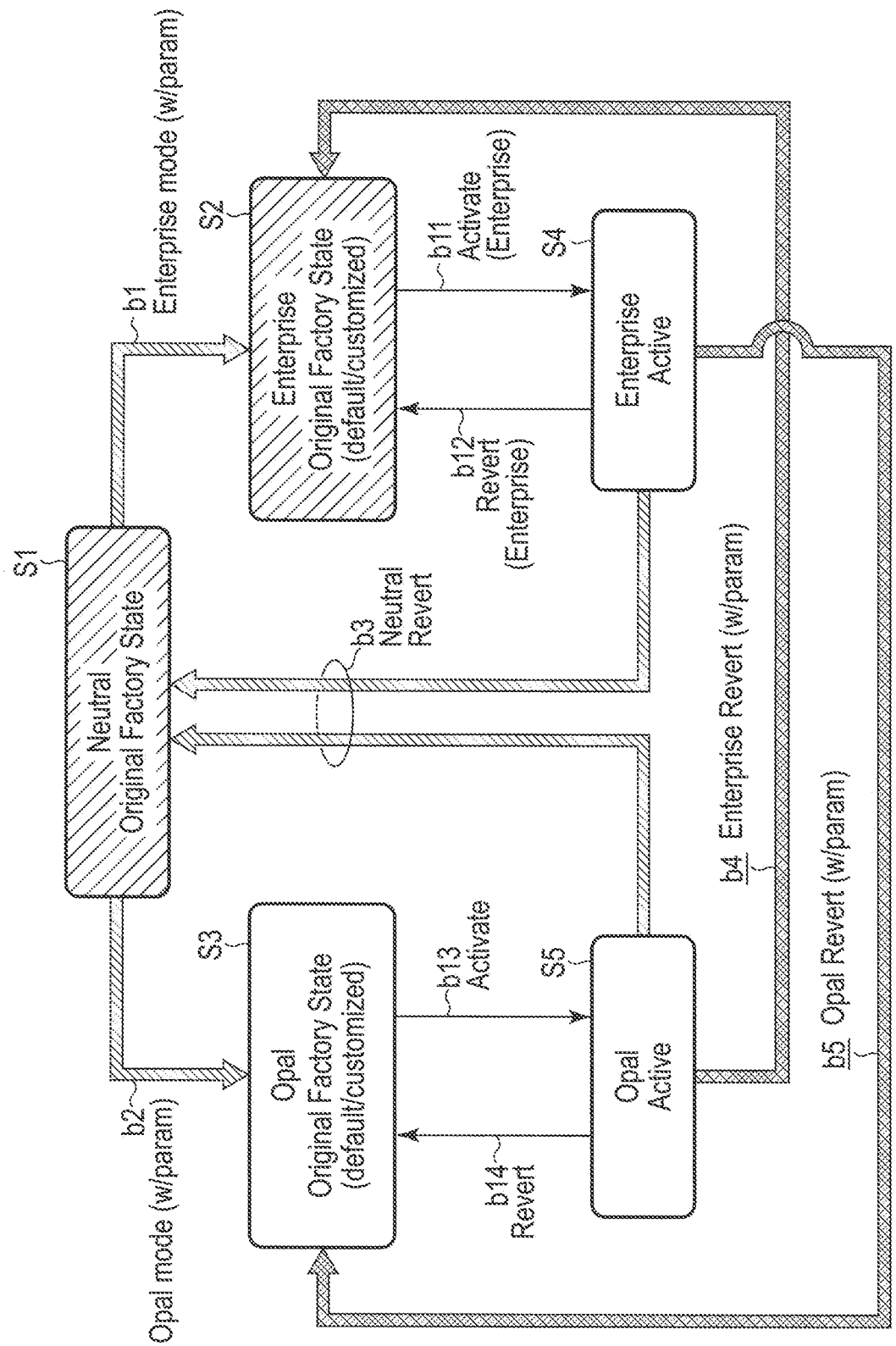
FIG. 17 is a diagram shown for explaining the outline of a mechanism provided to allow the data storage apparatus to directly transition between an enterprise mode and an opal mode according to the fourth embodiment.

As shown in FIG. 17, the direct transition processor 119C is a processor provided to allow the data storage apparatus 1 to transition from an opal active state to an enterprise OFS without the intervention of a neutral OFS (b4) and to transition from an enterprise active state to an opal OFS without the intervention of a neutral OFS (b5) in procedures different from the above. Thus, in the data storage apparatus 1 of the present embodiment, as shown in FIG. 17 and FIG. 18, as a command for causing the data storage apparatus 1 to directly transition from an opal active state to an enterprise OFS, an enterprise revert command (an eighth command b4) is newly provided. Further, as a command for causing the data storage apparatus 1 to directly transition from an enterprise active state to an opal OFS, an opal revert command (a ninth command b5) is newly provided. The authority to issue enterprise revert and opal revert commands is given to a dedicated PIN. In a manner similar to that of FIG. 5, in FIG. 18, (A) shows commands issued in a neutral OFS where the data storage apparatus 1 is set to neither the enterprise mode nor the opal mode. (B) shows commands issued in the enterprise mode. (C) shows commands issued in the opal mode.

When an enterprise revert command is issued, the direct transition processor 119C performs a process (an eighth process) for causing the data storage apparatus 1 to transition from an opal active state to an enterprise OFS, using the initial image held in a default setting storage module 115. When an opal revert command is issued, the direct transition processor 119C performs a process (a ninth process) for causing the data storage apparatus 1 to transition from an enterprise active state to an opal OFS, using the initial image held in the default setting storage module 115.

With regard to enterprise revert and opal revert commands, a parameter may be added such that the generic or customized specification can be specified as the initial image.

For example, when the data storage apparatus 1 is caused to transition to an enterprise OFS or an opal OFS by an enterprise revert or opal revert command, the initialization processor 119 may not instruct a key manager 120 to update any encryption key. Thus, the data stored in one of the enterprise mode and the opal mode may be used after the initialization in the other one of the enterprise mode and the opal mode.

In this way, the data storage apparatus 1 of the present embodiment is capable of directly transitioning between the enterprise mode and the opal mode.

As described above, according to the data storage apparatus 1 of each embodiment, it is possible to provide a data storage apparatus comprising an encryption function for allowing the data storage apparatus to be used for either servers or PCs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus comprising:
a nonvolatile memory; and
a hardware processor configured to protect data on the nonvolatile memory by encryption in a first mode for a first intended purpose or a second mode for a second intended purpose,
wherein the hardware process is configured to:
store a first default image, a second default image and a third default image, the first default image being for reproducing a first state which is an initial state where the data storage apparatus is set to neither the first mode nor the second mode and a data protection function is not activated, the second default image being for reproducing a second state which is an initial state in the first mode where the data protection function is not activated, the third default image being for reproducing a third state which is an initial state in the second mode where the data protection function is not activated;
perform a first process for causing the data storage apparatus to transition from the first state to the second state with the stored second default image in response to a first command for a request to set the first mode in the first state; and
perform a second process for causing the data storage apparatus to transition from the first state to the third state with the stored third default image in response to a second command for a request to set the second mode in the first state.

2. The data storage apparatus of claim 1, wherein the hardware processor is further configured to:
perform a third process in response to a third command for a request to cause the data storage apparatus to transition to a fourth state where the data protection function is activated in the first mode in the second state, the third process being for causing the data storage apparatus to transition from the second state to the fourth state;
perform a fourth process in response to a fourth command for a request to cause the data storage apparatus to transition to a fifth state where the data protection function is activated in the second mode in the third state, the fourth process being for causing the data storage apparatus to transition from the third state to the fifth state;
perform a fifth process in response to a fifth command for a request to cause the data storage apparatus to transition to the second state in the fourth state, the fifth process being for invalidating data stored in the nonvolatile memory by updating an encryption key used to encrypt data or decrypt encrypted data, initializing a personal identification number (PIN) for authenticating a user of a host device, and causing the data storage apparatus to transition from the fourth state to the second state with the stored second default image;
perform a sixth process in response to a sixth command for a request to cause the data storage apparatus to transition to the third state in the fifth state, the sixth process being for causing the data storage apparatus to transition from the fifth state to the third state with the stored third default image by updating the encryption key and initializing the PIN; and
perform a seventh process in response to a seventh command for a request to cause the data storage apparatus to transition to the first state in the fourth state or the fifth state, the seventh process being for causing the data storage apparatus to transition from the fourth state or the fifth state to the first state with the stored first default image by updating the encryption key and initializing the PIN.

3. The data storage apparatus of claim 2, wherein the hardware processor is further configured to:
manage the PIN;
authenticate the user of the host device with the managed PIN; and
determine whether the authentication succeeds with the PIN which corresponds to authority having privilege to invoke a command from the host device, and permit execution of a process corresponding to the command when the authentication succeeds with the PIN to which the authority to issue the command is given, and
the management of the PIN comprises management of a dedicated PIN to which authority to issue the first command, the second command and the seventh command is given, in addition to an administrator PIN of administrator authority and a user PIN of normal user authority.

4. The data storage apparatus of claim 3, wherein the dedicated PIN is unchangeable.

5. The data storage apparatus of claim 3, wherein the dedicated PIN is allowed to be changed only in the first state.

6. The data storage apparatus of claim 2, wherein the hardware processor is further configured to manage the current state of the data storage apparatus regarding which state is currently applied to the data storage apparatus from the first state, the second state, the third state, the fourth state and the fifth state.

7. The data storage apparatus of claim 2, wherein the hardware processor is further configured to determine whether the encryption key should be updated when the fifth process or the sixth process is performed.

8. The data storage apparatus of claim 7, wherein:
the encryption key comprises a first encryption key for the first mode and a second encryption key for the second mode; and
the hardware processor is further configured to update the first encryption key when it is determined that the encryption key should be updated in the fifth process, and to update the second encryption key when it is determined that the encryption key should be updated in the sixth process.

9. The data storage apparatus of claim 2, wherein:
the second mode comprises a mode comprises a function for constructing a pre-boot authentication mechanism; and
the hardware processor is further configured to determine whether the pre-boot authentication mechanism should be initialized when the sixth process is performed.

10. The data storage apparatus of claim 2, wherein the hardware processor is further configured to:
perform an eighth process in response to an eighth command for a request to switch the first mode to the second mode and cause the data storage apparatus to transition to the third state in the fourth state, the eighth process being for causing the data storage apparatus to transition from the fourth state to the third state with the stored third default image; and
perform a ninth process in response to a ninth command for a request to switch the second mode to the first mode and cause the data storage apparatus to transition to the second state in the fifth state, the ninth process being for causing the data storage apparatus to transition from the fifth state to the second state with the stored second default image.

11. The data storage apparatus of claim 10, wherein the hardware processor is further configured not to invalidate the data stored in the nonvolatile memory when the eighth process or the ninth process is performed.

12. The data storage apparatus of claim 2, wherein the hardware processor is further configured to:
    store two types of specification images including a generic specification image and a customized specification image for one of the second default image and the third default image or both of them; and
    select one of the generic specification image and the customized specification image to be used based on a parameter added to the sixth command or the seventh command.

13. The data storage apparatus of claim 12, wherein the hardware processor is further configured to store two types of initial images for at least one of the second default image and the third default image as the generic specification image and the customized specification image, different default images being applied to the two types of initial images, a program being stored in the two types of initial images respectively.

14. The data storage apparatus of claim 1, wherein:
    the first mode comprises a mode operating in accordance with a Trusted Computing Group (TCG) Enterprise SSC standard; and
    the second mode comprises a mode operating in accordance with a TCG opal SSC standard.

* * * * *